May 14, 1946. W. A. MATTHEWS 2,400,126
PNEUMATICALLY CONTROLLED AUTOMATIC PILOT
Filed Sept. 5, 1941
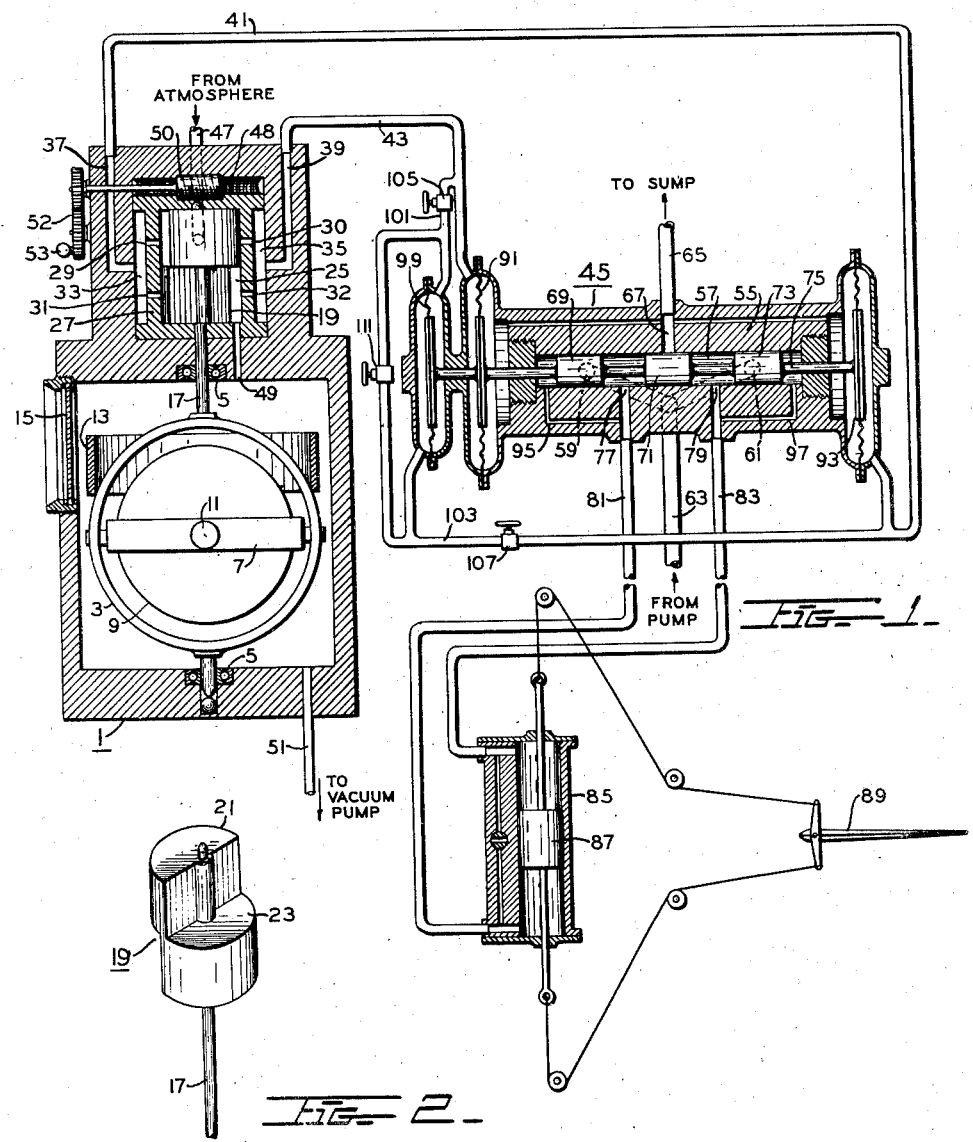
INVENTOR,
WILLIAM A. MATTHEWS,
BY
Herbert H. Thompson
HIS ATTORNEY Patented May 14, 1946

2,400,126

UNITED STATES PATENT OFFICE 2,400,126

PNEUMATICALLY CONTROLLED AUTOMATIC PILOT

William A. Matthews, Valley Stream, N. Y., assignor to Sperry Gyroscope Company, Inc., Brooklyn, N. Y., a corporation of New York Application September 5, 1941, Serial No. 409,642

4 Claims. (Cl. 244—78)

The present invention relates to automatic pilots for dirigible craft, especially for aircraft.

The present invention more specifically relates to aircraft automatic pilots of the type disclosed in U. S. Patents No. 2,210,916 and No. 2,210,917 to T. W. Kenyon and S. J. Zand, in which a direction maintaining instrument pneumatically controls a relay valve, which in turn controls a hydraulic servo-motor to adjust the attitude controls of the craft. The present invention is concerned with providing a more satisfactory device of the above type which is substantially free from hunting and yet remains sensitive and positive acting at all times.

It is accordingly an object of the present invention to provide an anti-hunting servo system controlled from a relatively sensitive and weak controlling object, such as a gyroscope.

It is a further object of this invention to provide an anti-hunting and damping device for use with a relay valve.

It is still another object of the present invention to provide an improved and readily adjustable pneumatically controlled anti-hunting and damping means for use with a pneumatically controlled relay valve controlling a hydraulic servo-motor.

The present invention is disclosed with respect to a rudder control system controlled from a directional gyro. It will be clear that the invention could equally well be applied to any type of control system generated from any type of direction-maintaining or control device.

Other objects and advantages of this invention will become apparent as the description proceeds.

In the drawing:

Fig. 1 shows a view, partly in section, of the system of the invention.

Fig. 2. shows a perspective view of the pick-off control element of the system of Fig. 1.

In Fig. 1. there is shown a directional gyro having a housing 1 in which is rotatably mounted a vertical gimbal ring 3 as by bearings 5. Rotatably supported within vertical ring 3 is a horizontal gimbal ring 7 in which is mounted the rotor housing 9, pivoted as at 11 about a normally horizontal axis perpendicular to the pivot axis of horizontal ring 7. The gyro rotor may be rotated in any suitable manner, such as by air, by vacuum, or electrically. A compass card 13 may be fastened to vertical ring 3 and viewed through window 15 in housing 1, thereby yielding direction indication.

Also fastened to vertical ring 3, as by shaft 17, is the pick-off control member 19 which thereby rotates with vertical ring 3 about axis 17. This control member is formed as two substantially semi-cylindrical sections 21, 23, axially displaced along shaft 17, and in opposed positions, as shown in Fig. 2.

Control member 19 is positioned within cylindrical chamber 25 formed inside member 27 supported on housing 1. Member 27 is formed with two pairs of diametrically opposed openings or ports, 29, 30 and 31, 32. Openings 29 and 31 connect chamber 25 with chamber 33 which forms a portion of an annular cavity. In like fashion, openings 30 and 32 connect chamber 25 with chamber 35, similar to chamber 33. Also communicating with chamber 25 is a duct 47 which connects the upper half of chamber 25 to the atmosphere. Passageways 37, 39 connect chambers 33 and 35 to ducts 41 and 43 respectively, which lead to relay valve 45.

The lower half of chamber 25 is connected to a source of low pressure. Fig. 1 shows one method of effecting this. Chamber 25 is connected to housing 1 by passageway 49. Housing 1 may be connected to a vacuum pump by duct 51. This same pump may serve to rotate the gyro rotor, if an airspun gyro is used.

In operation under normal conditions, sections 21 and 23 are symmetrically positioned with respect to ports 29, 30 and 31, 32 so that equal amounts of air pass from duct 47 to passageway 49 by way of port 29, cavity 33 and port 31 on the one hand, and port 30, cavity 35 and port 32 on the other hand. No air will flow directly from duct 47 to passageway 49, since the upper and lower halves of chamber 25 are separated by the control member 19. It is clear that two separate chambers and two separate control members, corresponding to sections 21 and 23, may equally well be used.

As a result of the above balanced condition, the pressures within cavities 33 and 35 are equal, giving zero pressure differential between ducts 41 and 43. If the craft, and hence housing 1 which is fixed thereto, should change its heading, gyro rotor 9 would maintain fixed orientation in space so that control member 19 would rotate with respect to member 27. In such a case, as is illustrated in Fig. 1, section 21 of control member 19 would block one port, such as port 30, while opening the other port 29, whereby atmospheric pressure from duct 47 is led to cavity 33 and hence to duct 41. At the same time, port 31 would be blocked, so that atmospheric pressure is maintained in cavity 33, and port 32 is fully opened, connecting cavity 35 and hence duct 43, to the lowered pressure of housing 1, by way of duct 49. Hence a pressure differential is set up between ducts 41 and 43, which operates valve 45, as will be described.

If the craft heading is changed in the other sense, reverse action would take place. That is, duct 43 would be connected to atmospheric pressure, and duct 41 would be connected to the vacuum pump pressure in a similar manner.

It is clear that the action of valve 45, in response to differential pressure in ducts 41, 43, depends on the relative orientation of directional gyro 9 and ports 29, 30, 31, 32. Accordingly, to provide a course-setting means, member 27, which carries the ports, is made rotatable in housing 1. Means, such as worm wheel 48, worm 50, gearing 52 and handle 53 are provided to set member 27 relative to housing 1 and thereby determine the course to be flown.

Relay valve 45 is pneumatically controlled hydraulic valve. The valve has an outer body 55 and an inner bore 57. Communicating with ports 59, 61 of bore 57 is duct 63, which leads to a source of hydraulic pressure, such as a pump. Duct 65 connects with a central port 67 of bore 57 and leads to a sump of hydraulic fluid, from which the pump obtains its charge. Also communicating with bore 57 are output ports 77, 79 leading to ducts 81, 83.

Cooperating with bore 57 and ports 59, 61 and 67 is a multiple piston having three sections 69, 71, 73 on the same piston rod 75. These sections 69, 71, 73 are so dimensioned and spaced as to provide a double-acting valve. Thus in the positions shown in Fig. 1, which is the neutral position, all ports 59, 61 and 67 are blocked off by their respective piston sections. When piston rod 75 is moved in one direction, say to the left, the ports 59 and 67 are uncovered so that outlet port 77 now communicates with pressure port 59, and outlet port 79 connects with sump port 67, thereby increasing the pressure in duct 81 over that in duct 83.

The differential pressure between ducts 81 and 83 is applied to hydraulic servo-motor 85 to move its piston 87 and thereby actuate rudder or other navigation control 89.

When piston rod 75 and sections 69, 71, 73 move to the right, the connections are reversed, duct 83 receiving the higher pressure and duct 81 the lower pressure, whereby control 89 is actuated in reverse direction.

The control of piston rod 75 from the differential pneumatic pressure in ducts 41, 43 is provided by means of pneumatic diaphragms 91, 93. It will be readily seen that greater pressure in duct 43 will drive piston rod 75 to the right, while greater pressure in duct 41 will drive the rod 75 to the left. The passages 95 and 97, respectively connecting the ducts 81 and 83 with bore 57 adjacent opposite ends thereof supply fluid to opposite outer surfaces of the outer sections or lands 69 and 73 of the piston valve member. The valve member is therefore subjected to the controlling differential pressures acting on diaphragms 91 and 93 and also to the pressure of the fluid controlled thereby.

The system therefore constitutes one having a pressure repeat-back. That is, the pressure (or force) on rudder 89, reacting back through motor 85 and valve 45, is balanced by the differential air pressure in ducts 41, 43. The rudder pressure is therefore controlled by the gyro, rather than rudder displacement as is most commonly used.

In the system thus far described, the rudder control is responsive solely to relative displacement of craft and gyro axis, and, therefore, to deviation of the craft from set course. Such a system is inherently subject to hunting and oscillating about the desired course, since the control signal ceases only when the craft is back to its original course, at which time the inertia of the craft swings it beyond the desired course, resulting in hunting. To prevent this hunting it is necessary to provide a "meeting" or "anticipating" effect, so that a definite opposing force is present to prevent the craft from overshooting its proper heading.

The present invention overcomes this hunting by providing an additional control force derived from, but delayed with respect to, the controlling effect. Thus, an additional diaphragm 99 is provided, also fastened to piston rod 75. The opposed sides of this diaphragm are supplied with pressure from ducts 41 and 43 by way of ducts 101, 103, in which are inserted throttling valves 105, 107. Ducts 101, 103 are so connected that the effect of diaphragm 99 opposes that of diaphragms 91, 93. However, because of valves 105, 107, the effect of any craft deviation on diaphragm 99 is delayed with respect to that on diaphragms 91, 93. Hence, when a craft deviation occurs, diaphragms 91, 93 operate immediately to give opposite rudder to return the craft to its set course. Diaphragm 99 is ineffective at the first instant, coming into play slightly later, at a time delay determined by the setting of throttle valves 105, 107. The effect of diaphragm 99 is to reduce the effective signal controlling rudder 89, so that the rudder is returned to its zero or neutral position before the craft regains its set course. In fact, at the time the craft reaches its proper course, the effect of diaphragms 91, 93 is zero, but that of diaphragm 99 persists to give a net negative effect, so that the rudder 89 is thrown oppositely to "meet" the swing of the craft and prevent overshooting of the desired course.

Diaphragm 99 is made smaller in area than diaphragms 91, 93 in order to have less effect, since the damping action requires forces smaller than the actual control forces. Also, ducts 101 and 103 are jointed through a throttling valve 111. This valve 111 provides an additional means for adjusting the effect of diaphragm 99 relative to diaphragms 91, 93. It will be seen that with valve 111 fully open, diaphragm 99 is inoperative, since no pressure differential can exist on its two faces. With valve 111 closed all the way, maximum effect is obtained. Intermediate positions of the valve 14 will produce intermediate effects. Valve 111 has little effect on the pressure differential between ducts 41 and 43, since this differential is maintained across valves 105 and 107.

From the foregoing it will be seen that the present invention has provided simple and effective means for anti-hunt control, applied at the relay valve 45. This requires no connection to the sensitive gyro mechanism, and hence avoids any disturbance to the gyro or pick-off mechanism.

It will be obvious that this device is not restricted for use with automatic aircraft rudder control, as illustrated, but may be used wherever a relay control valve is needed. A damping means for such a relay control valve, readily adjustable to meet many kinds of operating conditions, is thus provided.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

I claim:

1. In an automatic pilot for controlling a control surface of a dirigible craft so as to steer a straight course without hunting and comprising a hydraulic motor operatively connected with said control surface, a relay valve for controlling the flow of fluid to said motor, means responsive to the pressure of fluid supplied to said motor for effecting a fluid-controlling movement of said valve, a primary and a secondary differential fluid-pressure-responsive means connected with said valve for effecting fluid-controlling operations thereof, said secondary means having less area than said primary means, a position-maintaining reference having a differential airflow pick-off thereon, means for supplying fluid to both of said pressure-responsive means from said pick-off in such manner that the secondary opposes the primary means, and means for delaying the build-up of pressure in the secondary of said pressure-responsive means.

2. In an automatic pilot for controlling a control surface of a dirigible craft so as to steer a straight course without hunting and comprising a position maintaining reference having a differential air flow pick-off thereon, a hydraulic motor operatively connected with said control surface, a relay valve for controlling the flow of fluid to said motor, means responsive to the pressure of fluid supplied to said motor for effecting a fluid-controlling movement of said valve, primary and secondary differential fluid-pressure-responsive means connected with said valve for effecting fluid-controlling operations thereof, means for supplying fluid to both of said pressure-responsive means from said pick-off in such manner that the secondary opposes the primary, means for delaying the build-up of pressure in the secondary of said pressure-responsive means, and means for controlling the rate of build-up and magnitude of the differential pressure in said secondary pressure-responsive means.

3. In an automatic pilot for controlling a control surface of a dirigible craft so as to steer a straight course without hunting and comprising a hydraulic motor operatively connected with said control surface, a relay valve for controlling the flow of fluid to said motor, valve and motor being connected in pressure repeat-back relation from said surface to said valve, said valve having a bore therein and a plurality of passages communicating with said bore, a valve member movably fitted within said bore and having means subjected to the fluid controlled thereby for effecting a fluid-controlling movement thereof, a primary and secondary differential fluid-pressure-responsive means connected with said valve member for effecting fluid-controlling operations thereof, the primary responsive means having greater area than the secondary responsive means, a position maintaining reference having a differential fluid pick-off thereon, means for supplying fluid to both of said pressure-responsive means from said pick-off in such manner that the secondary opposes the primary, and means for delaying the build-up of pressure in one of said pressure-responsive means, whereby hunting of the craft is prevented.

4. A device of the character recited in claim 3 further including means for controlling the magnitude of the pressure differential applied to one of said pressure-responsive means.

WILLIAM A. MATTHEWS.